(12) United States Patent
McClements et al.

(10) Patent No.: US 10,558,571 B2
(45) Date of Patent: Feb. 11, 2020

(54) SECOND LEVEL DATABASE FILE CACHE FOR ROW INSTANTIATION

(71) Applicants: Tim McClements, Waterloo (CA); Michael Vander Ploeg, Waterloo (CA)

(72) Inventors: Tim McClements, Waterloo (CA); Michael Vander Ploeg, Waterloo (CA)

(73) Assignee: SYBASE, INC., Dublin, CA (US)

( * ) Notice: Subject to any disclaimer, the term of this patent is extended or adjusted under 35 U.S.C. 154(b) by 327 days.

(21) Appl. No.: 14/221,081

(22) Filed: Mar. 20, 2014

(65) Prior Publication Data

US 2015/0269179 A1 Sep. 24, 2015

(51) Int. Cl.
*G06F 12/084* (2016.01)
*G06F 16/2455* (2019.01)
*G06F 12/0871* (2016.01)

(52) U.S. Cl.
CPC ...... *G06F 12/084* (2013.01); *G06F 16/24552* (2019.01); *G06F 12/0871* (2013.01); *G06F 2212/3042* (2013.01); *G06F 2212/311* (2013.01); *G06F 2212/465* (2013.01)

(58) Field of Classification Search
CPC ............... G06F 12/084; G06F 12/0871; G06F 2212/3042; G06F 2212/311; G06F 2212/465; G06F 17/3048
See application file for complete search history.

(56) References Cited

U.S. PATENT DOCUMENTS

| 4,464,712 A | 8/1984 | Fletcher |
| 5,584,013 A | 12/1996 | Cheong et al. |
| 5,668,987 A | 9/1997 | Schneider |
| 5,826,052 A | 10/1998 | Stiles et al. |
| 6,338,117 B1 * | 1/2002 | Challenger ........... G06F 12/121 711/122 |
| 6,341,288 B1 | 1/2002 | Yach et al. |
| 6,349,372 B1 * | 2/2002 | Benveniste ............. G06F 12/08 707/999.101 |

(Continued)

FOREIGN PATENT DOCUMENTS

| EP | 2529374 A2 | 12/2012 |
| EP | 2660732 A1 | 11/2013 |

(Continued)

OTHER PUBLICATIONS

"CPU cache" definition on Wikipedia NPL captured by Wayback Machine. Jan. 21, 2013. Also available at <https://web.archive.org/web/20130121005144/https://en.wikipedia.org/wiki/CPU_cache#Exclusive_versus_inclusive>.*

(Continued)

*Primary Examiner* — Ann J Lo
*Assistant Examiner* — Jane Wei
(74) *Attorney, Agent, or Firm* — Schwegman Lundberg & Woessner, P.A.

(57) ABSTRACT

In an example embodiment, one or more pages from a database are stored in a page cache stored in a shared memory, the one or more pages stored in a packed format. One or more rows from the database are stored in a row cache stored in the shared memory, the one or more rows stored in an unpacked format. A request for a row of the database is received. Then, the row cache is searched for the row. In response to a determination that the row cannot be found in the row cache, the page cache is searched for the row. Finally, the row is returned.

20 Claims, 8 Drawing Sheets

(56) References Cited

U.S. PATENT DOCUMENTS

| | | | |
|---|---|---|---|
| 7,278,005 B1* | 10/2007 | Wolf | G06F 9/5016 |
| | | | 707/999.202 |
| 7,284,096 B2 | 10/2007 | Schreter | |
| 7,421,562 B2 | 9/2008 | Bhatt et al. | |
| 8,543,765 B2 | 9/2013 | Glover et al. | |
| 2004/0044694 A1* | 3/2004 | Henig | G06F 8/60 |
| 2005/0015374 A1* | 1/2005 | Reinauer | G06F 12/0868 |
| 2008/0028154 A1* | 1/2008 | Hoover | G06T 15/50 |
| | | | 711/130 |
| 2011/0225376 A1* | 9/2011 | Hasting | G06F 9/3851 |
| | | | 711/154 |
| 2013/0159285 A1 | 6/2013 | Dees et al. | |
| 2013/0166554 A1* | 6/2013 | Yoon | G06F 17/30312 |
| | | | 707/737 |
| 2013/0227241 A1* | 8/2013 | Shimizu | G06F 12/023 |
| | | | 711/171 |
| 2013/0290282 A1 | 10/2013 | Faerber et al. | |
| 2013/0311724 A1* | 11/2013 | Walker | G06F 12/0811 |
| | | | 711/136 |
| 2014/0047209 A1* | 2/2014 | Pizlo | G06F 8/443 |
| | | | 711/173 |
| 2015/0019813 A1* | 1/2015 | Loh | G06F 12/0866 |
| | | | 711/122 |
| 2015/0019834 A1* | 1/2015 | Loh | G06F 12/023 |
| | | | 711/208 |
| 2015/0186051 A1* | 7/2015 | Gurajada | G06F 3/0611 |
| | | | 711/113 |

FOREIGN PATENT DOCUMENTS

| | | |
|---|---|---|
| EP | 2660734 A1 | 11/2013 |
| EP | 2660736 A1 | 11/2013 |

OTHER PUBLICATIONS

"CPU cache" definition on Wikipedia NPL captured by Wayback Machine. Jan. 21, 2013. Also available at <https://web.archive.org/web/20130121005144/https://en.wikipedia.org/wiki/CPU_cache#Exclusive_versus_inclusive>. (Year: 2013).*

* cited by examiner

SECOND LEVEL DATABASE FILE CACHE FOR ROW INSTANTIATION

TECHNICAL FIELD

This document generally relates to methods and systems for use with databases. More particularly, this document relates to a second level database file cache for row instantiation.

BACKGROUND

Databases often utilize page caches to improve performance. The page cache stores frequently-accessed pages from the database and is generally faster to access than the underlying database. Generally, when a query is made, the page cache is first checked to see if the desired data is in one of the pages in the cache (called a "cache hit"). If so, the data is retrieved from the cache. Only if the data is not in the cache (called a "cache miss") is the underlying database accessed for the data.

With the growth in popularity of mobile devices, more and more databases have been created to operate on mobile devices. Often these mobile device databases support synchronization with a server. When these mobile device databases were first implemented, however, mobile devices had much stricter memory requirements than they do now. Available memory has increased greatly on modern smartphones, and mobile device databases have generally adapted by using a large page cache.

In order to access a row of data in a mobile device database, the mobile device database usually looks up the row location in a map (stored in the database file) and loads the page containing the row. It then unpacks (de-serializes) the row into memory for access. The unpacked row is typically larger than the packed row because of variably-sized columns which are fixed (and aligned) when unpacked. This operation is on the usual path for many database requests. Unpacking the rows each time, however, adds extra computation time.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

In an example embodiment, a second level cache is provided which stores unpacked rows. Memory can be shared between a page cache (first level cache) and the new row cache (second level cache). A specialized memory manager can be used to hold the cached rows. The specialized memory manager can support inserting new rows and removing individual or groups of old rows, and can use memory efficiently while executing quickly (using less computational time). Furthermore, a replacement algorithm can be provided for cached rows, to be used when the second level cache is full.

Figure 1:
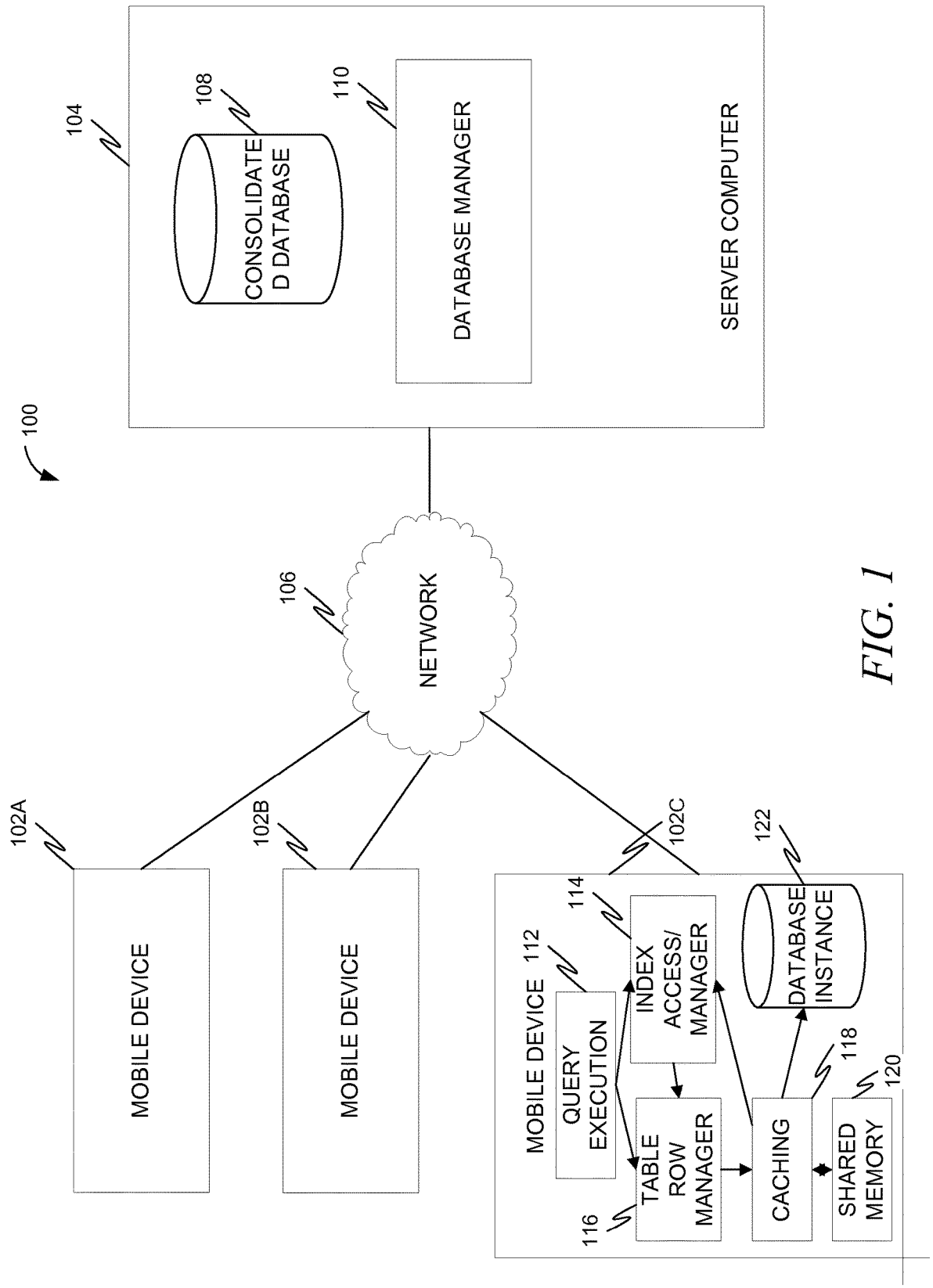
FIG. 1 is a block diagram illustrating a system for implementing mobile device databases, in accordance with an example embodiment.

FIG. 1 is a block diagram illustrating a system 100 for implementing mobile device databases, in accordance with an example embodiment. The system includes a plurality of mobile devices 102A, 102B, 102C, each connected to a Server computer 104 via a network 106. The network 106 may be, for example, the Internet or any wired or wireless communications network, such as local area networks, wide area networks, etc. Example mobile devices will be described later with respect to FIG. 7. Example server computers will be described later with respect to FIG. 8. The Server computer 104 can include a consolidated database 108, which consolidates data from each of the mobile devices 102A, 102B, 102C. The consolidated database 108 can be managed by a database manager 110, which acts to synchronize the data between the consolidated database 108 and the various mobile devices 102A, 102B, 102C.

Mobile device 102C is depicted as including a number of components. It should be noted that these components can also be present in mobile device 102A and mobile device 102B, but are simply not pictured in this diagram for brevity.

One of these components includes a query execution component 112. The query execution component 112 acts to parse a database query and scan and index the query. An index access/manager component 114 acts to access and manage an index used to locate pages in a page cache. A table row manager 116 acts to manage the rows of tables in a row cache. A caching component 118 then acts to manage the row cache and the page cache, which both can be stored in a shared memory 120. A database instance 122 can then be accessed if cache misses occur in both the row cache and page cache, as will be described in more detail below.

Within the caching component 118 can be a global memory manager, which can control distribution of the shared memory 120 between the two caches (e.g., row cache and page cache). Each of the caches can send allocation requests to the global memory manager. The global memory manager then can return memory to the caches in one or more memory segments, which each cache can use. The global memory manager can fully satisfy each request as long as memory is available in the shared memory 120. In an example embodiment, when memory runs low, the global memory manager can favor the page cache over the row cache because the page cache can provide better performance results per unit of memory. The global memory manager can deny memory requests from the row cache, and when the page cache requests more memory, the global memory manager can take memory segments that were previously allocated to the row cache and allocate the memory segments to the page cache. If the row cache becomes too small to improve performance (by, for example, falling below a performance threshold), the row cache can be disabled to avoid extra memory usage. The performance threshold, for example, could be fixed, or could be dynamically determined based on runtime parameters.

In an example embodiment, the rows in the row cache are not fully packed. There can be some limited compression of the data for the rows, for example, by the removal of unused memory space from variably sized strings and binary columns. The offsets and distances used to produce the full unpacked row can be stored with each row. This minimizes the resources used to retrieve the row while still using memory space efficiently. In an example embodiment, a hash table can be used for efficient lookup of existing rows and detection of missing rows. For example, the table row manager 116 can identify the rows to be stored in the row cache, store the rows in an unpacked format in the row cache, determine the offsets and distances for the stored rows, and store the offsets and distances with each row.

In an example embodiment, the row cache can keep a list of the memory segments (also hereinafter referred to as "segment" or "segments") assigned to the row cache and also can maintain the concept of a current memory segment (also hereinafter referred to as "current segment"). When a row is added to the row cache, memory can be allocated to the row from the current segment. If there is not enough free memory on the current segment, the next segment in the list can be chosen as the current segment. If there is a suitable amount of memory available in the current segment, the current segment may be defragmented by moving the allocated memory to the front of the current segment and the memory freed by the removal of the associated row from the row cache to the end of the current segment, so that more memory can be allocated from the current segment. If the total amount of available memory across the segments (e.g., all segments in the row cache) becomes low (e.g., below a certain threshold, either static or dynamic), the row cache can request more segments from the global memory manager.

In an example embodiment, a replacement algorithm can be used on the row cache. Each row in the row cache can have a score associated with it. If a row is accessed after a suitable time period has elapsed since the last time its score was changed, its score can be incremented. If a row has a high score, which would indicate that the row is accessed regularly, the row should remain in the row cache. When an allocator in the row cache runs out of memory on the current segment, the allocator can move to the next segment and iterate over the rows on row cache, lowering the scores of rows accordingly, and removing any row, whose score is below a certain threshold, from the row cache. If there now is a suitable amount of free memory space in the current segment, the current segment can be defragmented (as described above) and new rows can be allocated from this current segment. If there is not a suitable amount of free memory space in the current segment, the allocator can move to the next segment as the current segment and repeat the same operation for determining whether there is a suitable amount of free memory space in the current segment. If, after examining several next segments, a suitable amount of free memory space is not found, the threshold can be increased so that rows are more aggressively removed from the row cache and more free memory space is created. This can be repeated until the system determines a current segment as having a suitable amount of free memory space.

Figure 2:
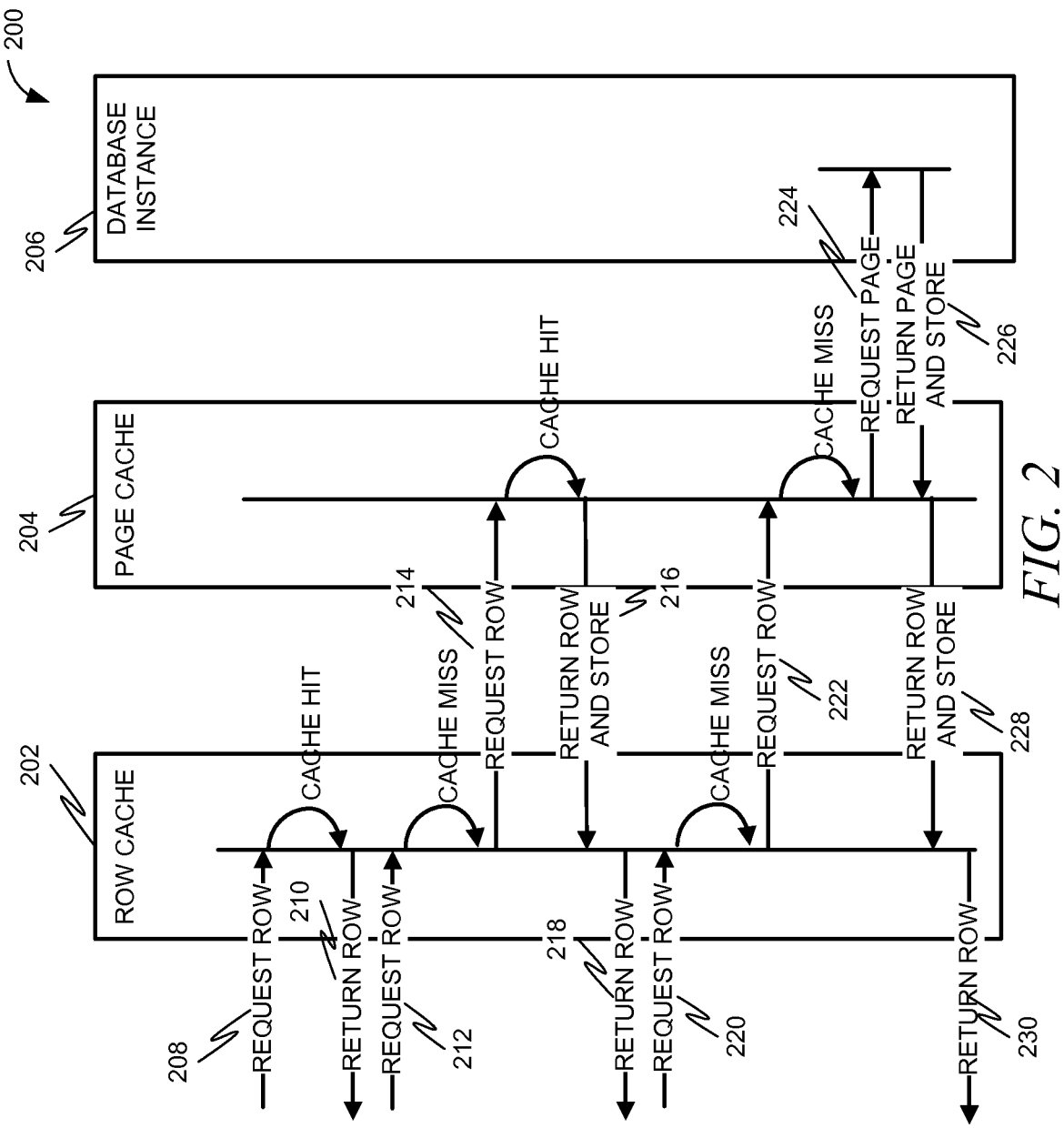
FIG. 2 is a ladder diagram illustrating a method, in accordance with an example embodiment, of satisfying a database query.

FIG. 2 is a ladder diagram illustrating a method 200, in accordance with an example embodiment, of satisfying a database query. This method can utilize a row cache 202, a page cache 204, a database instance 206, an index access/manager component (e.g., the index access/manager component 114 in FIG. 1), and a table row manager (e.g., table row manager 116 in FIG. 1). For example, at operation 208 a row request is made to the row cache 202 in response to the database query. For example, a table row manager can send the row request to a second level cache (e.g., row cache 202) that stores unpacked rows. This row request is an attempt to obtain information relevant to satisfying the query. In this instance, the requested row is contained in the row cache 202, resulting in a "hit" in the row cache 202, and thus at operation 210 the requested row is returned without accessing the page cache 204. Since the row is stored in the row cache in an unpacked format, the request row is returned without having to perform an unpacking operation.

In another example, a row may not be located at the second level cache (e.g., row cache 202) and a first level cache (e.g., page cache 204) may be examined. For example, at operation 212, a row is requested. In this instance, the row is not found in the row cache 202, resulting in a "miss" in the row cache 202. In response to not locating the row in the row cache 202, the row is requested from the page cache 204 at operation 214. In this instance, the row is found in the page cache, resulting in a "hit" in the page cache 204. Thus, at operation 216 the row is copied from the page cache 204, unpacked, and stored in the row cache 202. Then at operation 218, the requested row is returned from the row cache 202 in the unpacked format. The row from the page cache 204 is unpacked and stored in the second level cache (e.g., row cache 202) in the unpacked format to support subsequent requests for the same row. For example, if the same row is subsequently requested, the row can be found in the row cache 202. The storing of the rows in the unpacked format in the row cache reduces the number of unpacking operations for subsequent requests.

In another example, a row may not be located at the second level cache (e.g., row cache 202) or the first level cache (e.g., page cache 204), and the database instance 206 may be examined. For example, at operation 220, a row is requested. In this instance, the row is not found in the row cache 202, resulting in a "miss" in the row cache 202. Thus, at operation 222, the row is requested from the page cache 204. In this instance, the row is not found in the page cache 204, resulting in a "miss" in the page cache 204. Thus, at operation 224, a page containing the row is requested from the database instance 206. At operation 226, the database instance 206 returns the requested page, which is then stored in the page cache 204. At operation 228, the row from the page is returned to the row cache 202, the row is unpacked, and stored in the row cache 202 in the unpacked format. Thus, if the row is subsequently requested, the row will be found in the row cache 202. At operation 230, the requested row is returned in the unpacked format from the row cache 202.

It should be noted that the method 200 depicted in FIG. 2 is merely one example of an implementation that fills the row and page caches. Alternative embodiments are possible where, for example, rows are predictively added to the row cache and/or pages are predictively added to the page cache even before the rows are requested a first time. Other embodiments are foreseen where simply requesting a row or page a single time is not enough to have the system add the row or page to the corresponding cache; the system can add the row or page to the corresponding cache only after a threshold number of access attempts within a predefined period of time (e.g., 3 access attempts in a day).

Figure 3:
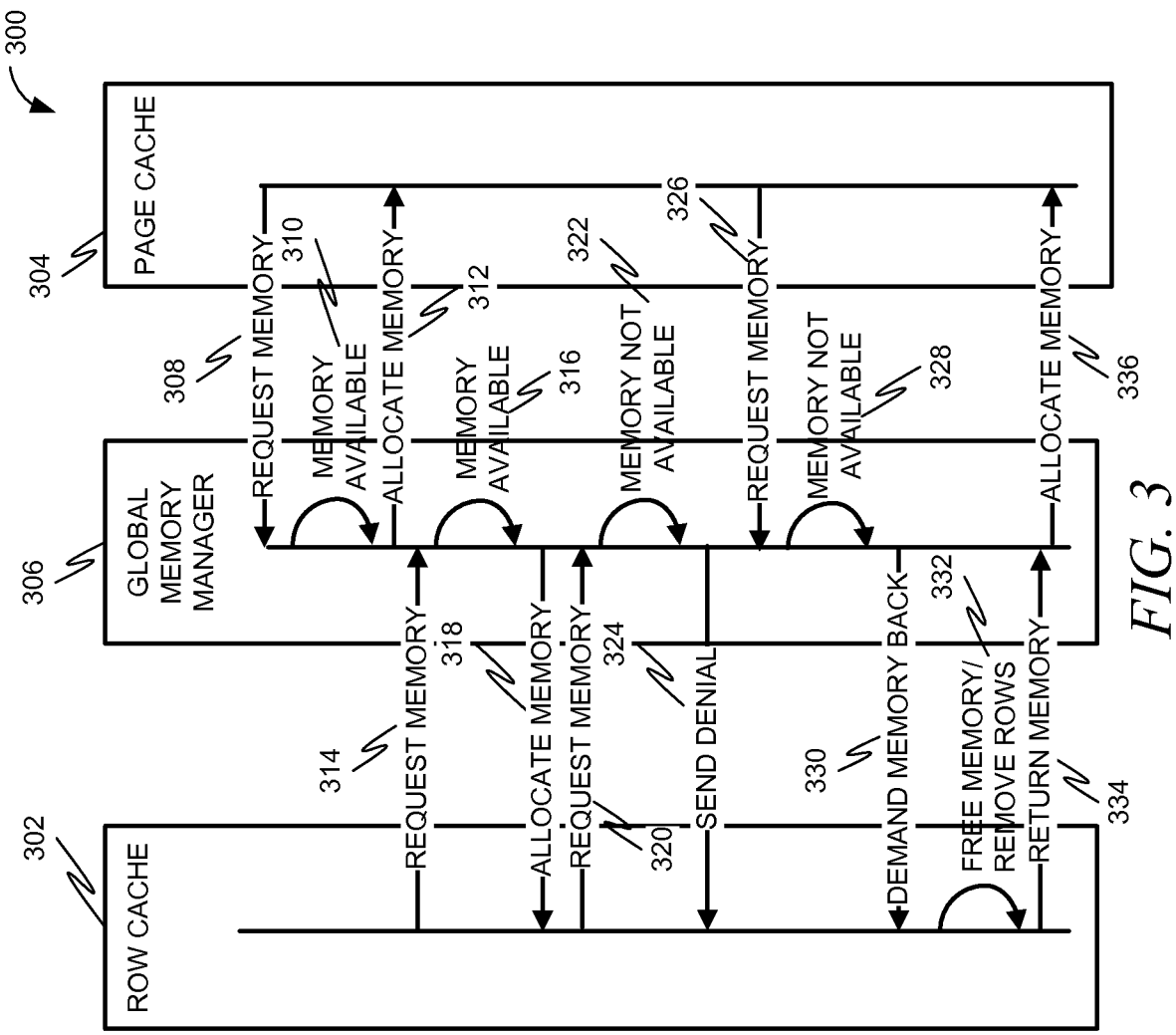
FIG. 3 is a ladder diagram illustrating a method, in accordance with an example embodiment, of managing shared memory.

FIG. 3 is a ladder diagram illustrating a method 300, in accordance with an example embodiment, of managing shared memory. Here, a row cache 302 and a page cache 304 each utilize data in a single shared memory. A global memory manager 306 controls allocation of the shared memory. For example, memory may be available and the global memory manager 306 can allocate memory, for example, to the page cache 304 and/or the row cache 302. For example, at operation 308, the page cache 304 can request memory from the global memory manager 306. At operation 310, the global memory manager 306 determines that memory is available, and at operation 312, the global memory manager 306 allocates memory to the page cache 304.

In another example, at operation 314, the row cache 302 can request memory from the global memory manager 306. At operation 316, the global memory manager 306 determines that memory is available, and at operation 318, the global memory manager 306 allocates memory to the row cache 302.

In other examples, memory may not be available. It can be assumed now, for purposes of illustration, that no more memory is available in the shared memory. For example, at operation 320, the row cache 302 can request memory from the global memory manager 306. At operation 322, the global memory manager 306 determines that no memory is available, and at operation 324, the global memory manager 306 denies the request for memory from the row cache 302.

In another example, at operation 326, the page cache 304 can request memory from the global memory manager 306. At operation 328, the global memory manager 306 determines that no memory is available. At operation 330, the global memory manager 306 demands memory back from the row cache 302. In response to this, at operation 332, the row cache 302 frees memory and removes the affected rows from the row cache 302. In one example embodiment, at this point the row cache 302 determines if too little memory remains (e.g., if the available memory has fallen below a threshold that indicates that the row cache has little value with so little memory). If too little memory remains, then the row cache 302 can be disabled. Either way, however, at operation 334, the row cache 302 returns the memory to the global memory manager 306. Then, at operation 336, the global memory manager 306 returns the memory to the page cache 304.

Figure 4:
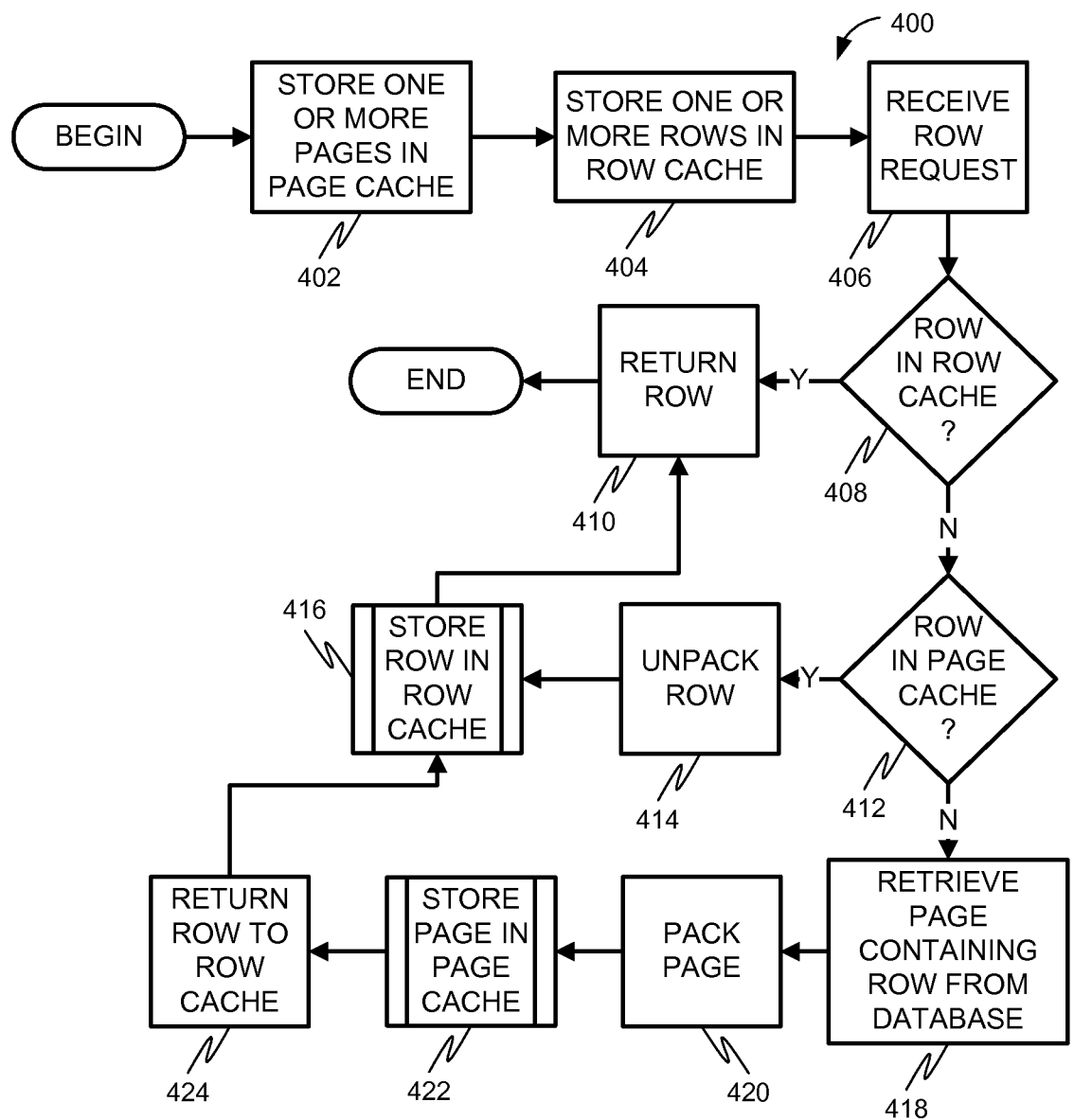
FIG. 4 is a flow diagram illustrating a method, in accordance with an example embodiment, of managing a shared memory for a database.

FIG. 4 is a flow diagram illustrating a method 400, in accordance with an example embodiment, of managing a shared memory for a database. Method 400 can be performed by processing logic that can comprise hardware (e.g., circuitry, dedicated logic, programmable logic, microcode, etc.), software (e.g., instructions run on a processing device), or a combination thereof. In one implementation, at least one or more portions of method 400 are performed by the table row manager 116 and index access/manager 114 of FIG. 1.

At operation 402, one or more pages from the database can be stored in a page cache stored in the shared memory. The one or more pages can be stored in a packed format. The one or more pages can store rows in the packed format. The storing of the one or more pages can be performed in a number of different ways and in response to a number of different circumstances. In one example embodiment, the one or more pages are stored in the page cache in response to a page cache "miss" where information from a page has been requested and is not present in the page cache. In another example embodiment, the one or more pages are stored in the page cache predictively.

At operation 404, one or more rows from the database are stored in a row cache stored in the shared memory. The one or more rows can be stored in an unpacked format. As in the case of the page cache, the storing of the one or more rows can be performed in a number of different ways and in response to a number of different circumstances. In one example embodiment, the one or more rows are stored in the row cache in response to a row cache "miss" where information from a row has been requested and is not present in the row cache. In another example embodiment, the one or more rows are stored in the row cache predictively. Additionally, adding the one or more rows to the row cache can or can not mean that the page containing the one or more rows is present in or added to the page cache. While in some embodiments, a row can be added to the row cache upon retrieval of the page containing the row from the page cache (meaning that the page containing the row is present in the page cache), in other embodiments the row can be retrieved (or predictively sent) directly from the database without regard for whether the page containing the row is present in the page cache.

At operation 406, a request for a row of the database is received. This request can be received in many different forms and from many different sources. In one example embodiment, the request comes in the form of a Structured Query Language (SQL) query from a mobile device application. The SQL query can then be parsed to determine the row or rows needed to fulfil the query. In the present description, the process will be described in terms of a single row, although one of ordinary skill in the art will recognize that the process can be repeated or augmented to retrieve additional rows.

At operation 408, the row cache is searched for the row. If the row is found in the row cache, then at operation 410 the row is returned. The row is returned in the unpacked format. If the row is not found in the row cache, then at operation 412 the page cache is searched for a page containing the row. If the page containing the row is found in the page cache, then at operation 414 the row is unpacked and at operation 416 the row is stored in the row cache in the unpacked format. Then, at operation 410, the row is returned in the unpacked format. If, at operation 412, the page containing the row is not found in the page cache, then at operation 418 the page containing the row is retrieved from the database. Then, at operation 420, the page containing the row is packed, and at operation 422, the page containing the row is stored in the page cache in a packed format. At operation 424, the row is returned to the row cache. The row can be unpacked and stored in the row cache in the unpacked format at operation 416.

Figure 5:
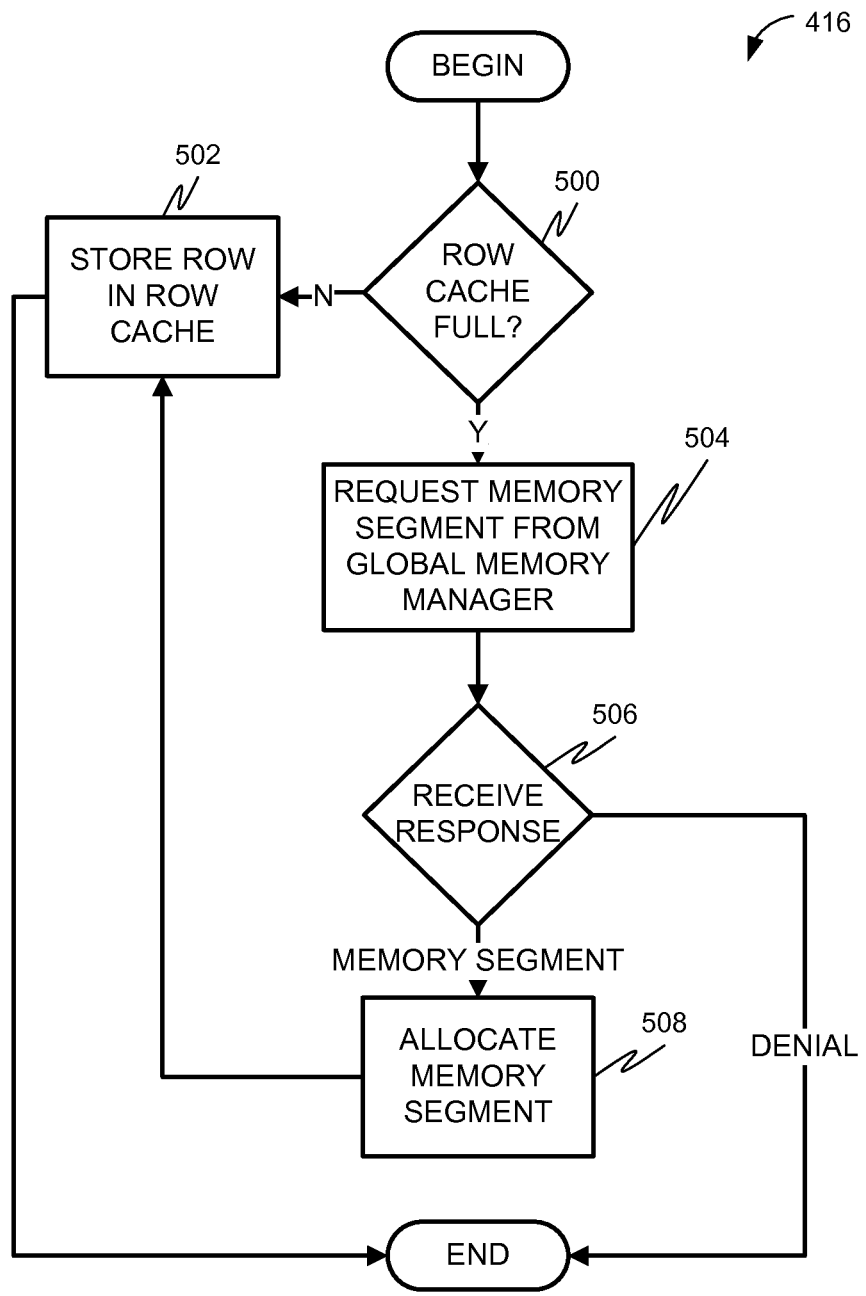
FIG. 5 is a flow diagram illustrating a method, in accordance with an example embodiment, of storing a row in a row cache.

FIG. 5 is a flow diagram illustrating a method, in accordance with an example embodiment, of storing a row in a row cache. This flow diagram can illustrate, for example, operation 416 of FIG. 4 in more detail. Method 500 can be performed by processing logic that can comprise hardware (e.g., circuitry, dedicated logic, programmable logic, microcode, etc.), software (e.g., instructions run on a processing device), or a combination thereof. In one implementation, at least one or more portions of method 500 are performed by a row cache of FIG. 1, as described above.

At operation 500, it is determined if the row cache is full. Full can be defined as not having enough room to store the row. If the row cache is not full, then at operation 502 the row is stored in the row cache. The row can be stored in an unpacked format. If the row cache is full, then at operation 504, a memory segment is requested from a global memory manager. At operation 506, a response is received from the global memory manager. This response can be either a denial or the requested memory segment. If the response is a denial, then the process ends without the row being stored in the row cache. If the response is the requested memory segment, however, at operation 508 the memory segment is allocated to the row cache, and then at operation 502 the row is stored in the row cache.

Figure 6:
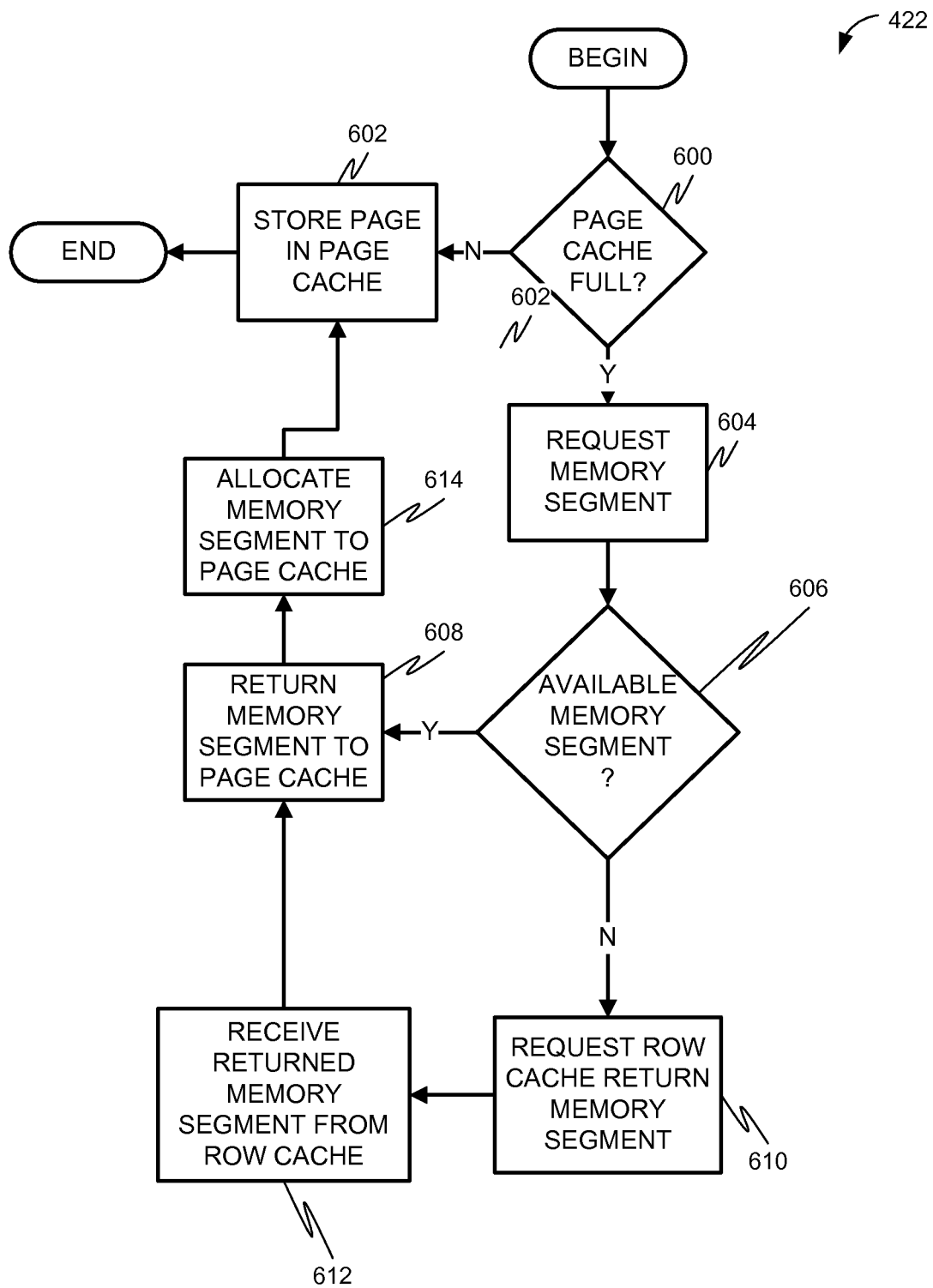
FIG. 6 is a flow diagram illustrating a method, in accordance with an example embodiment, of storing a page in a page cache.

FIG. 6 is a flow diagram illustrating a method, in accordance with an example embodiment, of storing a page in a page cache. This flow diagram can illustrate, for example, operation 422 of FIG. 4 in more detail. Method 422 can be performed by processing logic that can comprise hardware (e.g., circuitry, dedicated logic, programmable logic, microcode, etc.), software (e.g., instructions run on a processing device), or a combination thereof. In one implementation, at least one or more portions of method 422 are performed by a page cache of FIG. 1, as described above.

At operation 600, it is determined if the page cache is full. Full can be defined as not having enough room to store the page. If the page cache is not full, then at operation 602 the page is stored in the page cache. If the page cache is full, then at operation 604 a memory segment is requested from a global memory manager. At operation 606, the global memory manager determines if a free memory segment is available from a shared memory. If the free memory segment is available, then at operation 608 the global memory manager returns the free memory segment to the page cache. If the free memory segment is not available, then at operation 610, the page cache requests that a memory segment be returned from the row cache. At operation 612, the memory segment is returned from the row cache. The process can then proceed to operation 608, at which the memory segment returned from the row cache is returned to the page cache. At operation 614, the memory segment, whether returned from the shared memory or from the row cache, is allocated to the page cache, and at operation 602 the page is stored in the page cache.

Example Mobile Device

Figure 7:
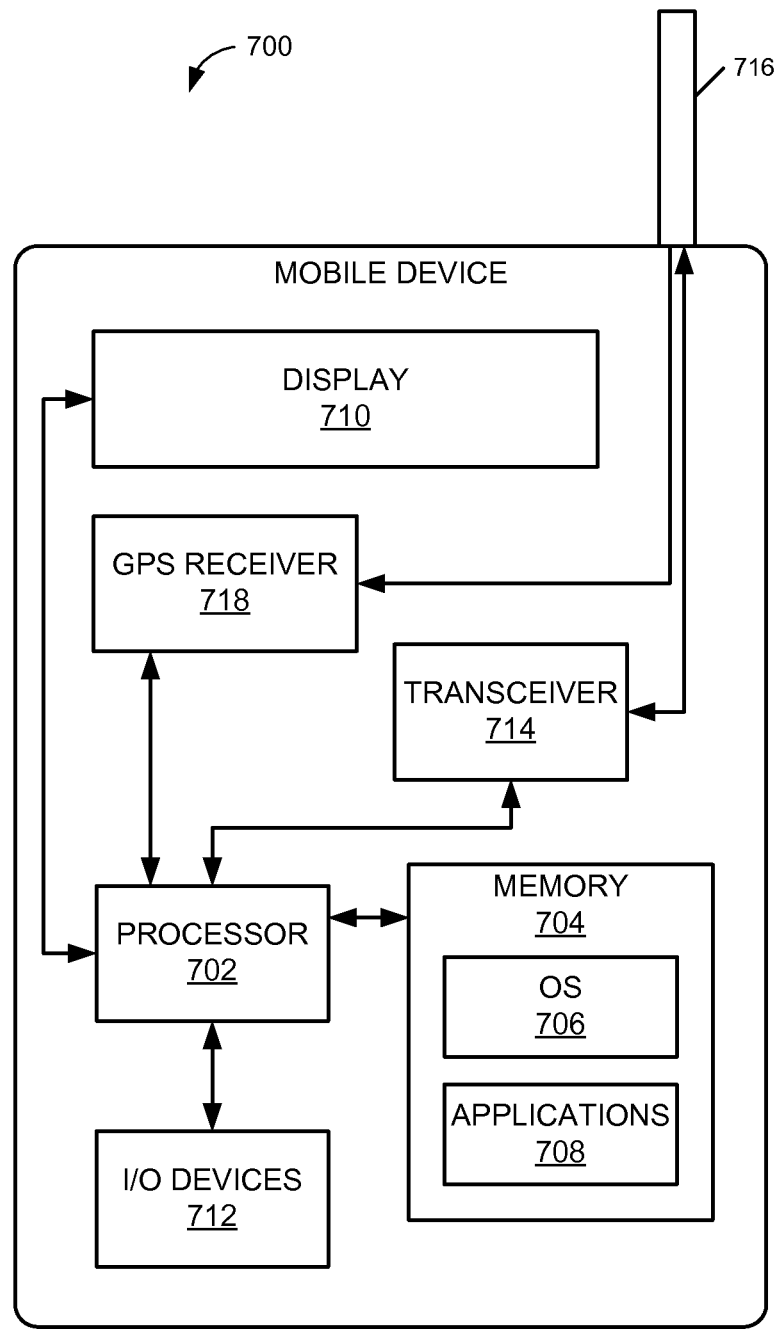
FIG. 7 is a block diagram illustrating a mobile device, according to an example embodiment.

FIG. 7 is a block diagram illustrating a mobile device 700, according to an example embodiment. The mobile device 700 can include a processor 702. The processor 702 can be any of a variety of different types of commercially available processors suitable for mobile devices (for example, an XScale architecture microprocessor, a Microprocessor without Interlocked Pipeline Stages (MIPS) architecture processor, or another type of processor). A memory 704, such as a Random Access Memory (RAM), a Flash memory, or another type of memory, can be accessible to the processor. The memory 704 can be adapted to store an operating system (OS) 706, as well as application programs 708, such as a mobile location enabled application that can provide LBSs to a user. The processor 702 can be coupled, either directly or via appropriate intermediary hardware, to a display 710 and to one or more input/output (I/O) devices 712, such as a keypad, a touch panel sensor, a microphone, and the like. Similarly, in some embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a GPS receiver 718 can also make use of the antenna 716 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein may, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or a server farm), while in other example embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments can be implemented in digital electronic circuitry, or in computer hardware, firmware, software, or combinations of these. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware can be a design choice. Below are set out hardware (e.g., machine) and software architectures that can be deployed, in various example embodiments.

Example Machine Architecture and Machine-Readable Medium

Figure 8:
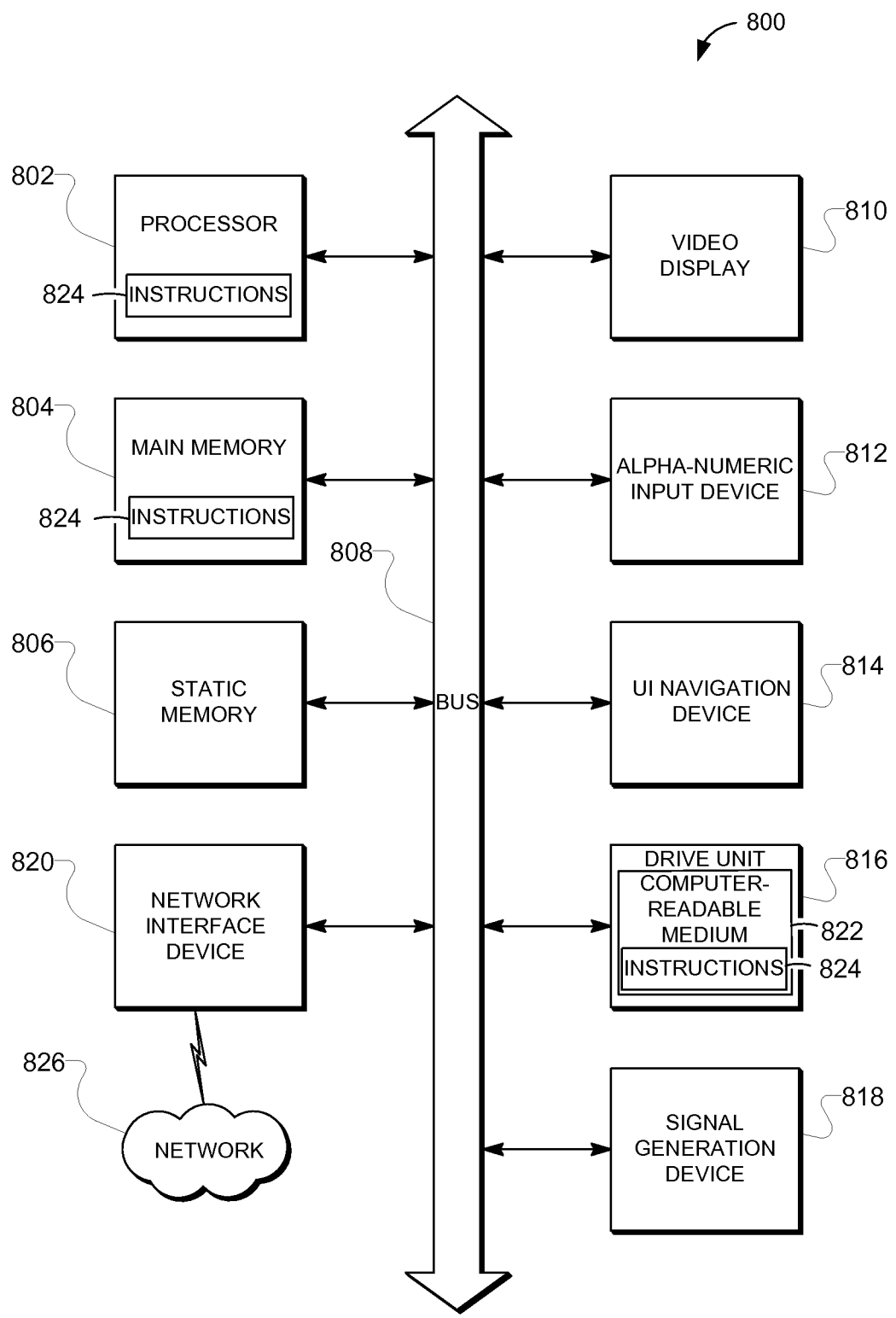
FIG. 8 is a block diagram of a machine in the example form of a computer system within which instructions for causing the machine to perform any one or more of the methodologies discussed herein can be executed.

FIG. 8 is a block diagram of a machine in the example form of a computer system 800 within which instructions for causing the machine to perform any one or more of the methodologies discussed herein can be executed. In alternative embodiments, the machine can operate as a stand-alone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 can further include a video display unit 810 (e.g., a liquid crystal display (LCD) or a cathode ray tube (CRT)). The computer system 800 can also include an alpha-numeric input device 812 (e.g., a keyboard or a touch-sensitive display screen), a user interface (UI) navigation device 814 (e.g., a mouse), a drive unit 816, a signal generation device 818 (e.g., a speaker), and a network interface device 820.

Machine-Readable Medium

The disk drive unit 816 includes a computer-readable medium 822 on which is stored one or more sets of instructions and data structures (e.g., software) 824 embodying or utilized by any one or more of the methodologies or functions described herein. The instructions 824 can also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" can include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 can further be transmitted or received over a communications network 826 using a transmission medium. The instructions 824 can be transmitted using the network interface device 820 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for managing a shared memory for a database, the method comprising:
    storing one or more pages from the database in a page cache stored in the shared memory, all data stored in the page cache being stored in packed format, wherein the page cache is a first level cache;
    storing one or more rows, from the one or more pages stored in the page cache, in a row cache stored in the shared memory, while the one or more rows remain stored in the page cache, the one or more rows stored in the row cache in an unpacked format, wherein the row cache is a second level cache, wherein the row cache is coupled to the page cache stored in the shared memory, the row cache maintaining a list of segments of memory assigned to the row cache, wherein the list of segments of memory assigned to the row cache includes some, but not all, segments in the shared memory;
    receiving a request for a row of the database;
    determining that the row is not found in the row cache;
    in response to the determination that the row is not found in the row cache, requesting the row from the page cache;
    determining that a current segment within the list of segments of memory assigned to the row cache has enough free memory to store the row; and
    in response to the determination that the current segment has enough free memory to store the row, defragmenting the current segment to move all allocated memory within the current segment to a front of the current segment.

2. The method of claim 1, further comprising, in response to a determination that the row cannot be found in the page cache, retrieving a page containing the row from the database.

3. The method of claim 2, further comprising, in response to retrieving the page from the database, storing the page in the page cache in a packed format and storing the row from the page in the row cache in an unpacked format.

4. The method of claim 1, further comprising, in response to a determination that the row is found in the page cache, retrieving the row from the page cache, unpacking the row, and storing the unpacked row in the row cache.

5. The method of claim 4, wherein the storing the unpacked row in the row cache includes partially compressing the previously unpacked row and storing offsets and distances to be used to decompress the previously unpacked row in the row cache along with the compressed previously unpacked row, and wherein the method further comprises using the stored offsets and distances to decompress the previously unpacked row.

6. The method of claim 5, wherein the partially compressing includes removing unused memory space from variably sized strings and binary columns.

7. The method of claim 3, wherein the storing the row in the row cache includes requesting a memory segment from a global memory manager and receiving a denial if the shared memory is full.

8. The method of claim 3, wherein the storing the page in the page cache includes requesting a memory segment from a global memory manager, and the global memory manager requesting that the row cache return a memory segment to the global memory manager if the page cache is full.

9. A system comprising:
a database;
a shared memory; and
a caching component executable by a processor and configured to:
store one or more pages from the database in a page cache stored in the shared memory, all data stored in the page cache being stored in packed format, wherein the page cache is a first level cache;
store one or more rows, from the one or more pages stored in the page cache, in a row cache stored in the shared memory, while the one or more rows remain stored in the page cache, the one or more rows stored in the row cache in an unpacked format, wherein the row cache is a second level cache, wherein the row cache is coupled to the page cache stored in the shared memory, the row cache maintaining a list of segments of memory assigned to the row cache, wherein the list of segments of memory assigned to the row cache includes some, but not all, segments in the shared memory;
receive a request for a row of the database;
determine that the row is not found in the row cache;
in response to the determination that the row is not found in the row cache, requesting the row from the page cache;
determine that a current segment within the list of segments of memory assigned to the row cache has enough free memory to store the row; and
in response to the determination that the current segment has enough free memory to store the row, defragment the current segment to move all allocated memory within the current segment to a front of the current segment.

10. The system of claim 9, wherein the system operates on a mobile device.

11. The system of claim 9, wherein the caching component is further configured to, in response to a determination that the row cannot be found in the page cache, retrieve a page containing the row from the database.

12. The system of claim 11, wherein the caching component is further configured to, in response to retrieving the page from the database, store the page in the page cache in a packed format and store the row from the page in the row cache in an unpacked format.

13. The system of claim 9, wherein the caching component is further configured to, in response to a determination that the row is found in the page cache, retrieve the row from the page cache, unpack it, and store the unpacked row in the row cache.

14. The system of claim 12, wherein the storing the unpacked row in the row cache includes partially compressing the previously unpacked row and storing offsets and distances to be used to decompress the previously unpacked row in the row cache along with the compressed previously unpacked row, and wherein the method further comprises using the stored offsets and distances to decompress the previously unpacked row.

15. The system of claim 12, wherein the storing the row in the row cache includes requesting a memory segment from a global memory manager and receiving a denial if the shared memory is full.

16. The system of claim 12, wherein the storing the page in the page cache includes requesting a memory segment from a global memory manager, and the global memory manager requesting that the row cache return a memory segment to the global memory manager if the page cache is full.

17. A non-transitory machine-readable storage medium comprising instructions, which when implemented by one or more machines, cause the one or more machines to perform operations comprising:
storing one or more pages from the database in a page cache stored in the shared memory, all data stored in the page cache being stored in packed format, wherein the page cache is a first level cache;
storing one or more rows, from the one or more pages stored in the page cache, in a row cache stored in the shared memory, while the one or more rows remain stored in the page cache, the one or more rows stored in the row cache in an unpacked format, wherein the row cache is a second level cache, wherein the row cache is coupled to the page cache stored in the shared memory, the row cache maintaining a list of segments of memory assigned to the row cache, wherein the list of segments of memory assigned to the row cache includes some, hut not all, segments in the shared memory;
receiving a request for a row of the database;
determining that the row is not found in the row cache;
in response to the determination that the row is not found in the row cache, requesting the row from the page cache;
determining that a current segment within the list of segments of memory assigned to the row cache has enough free memory to store the row; and
in response to the determination that the current segment has enough free memory to store the row, defragmenting the current segment to move all allocated memory within the current segment to a front of the current segment.

18. The non-transitory machine-readable storage medium of claim 17, wherein the operations further comprise, in response to a determination that the row cannot be found in the page cache, retrieving a page containing the row from the database.

19. The non-transitory machine-readable storage medium of claim 18, wherein the operations further comprise, in response to retrieving the page from the database, storing the page in the page cache in a packed format and storing the row from the page in the row cache in an unpacked format.

20. The non-transitory machine-readable storage medium of claim 17, wherein the operations further comprise, in response to a determination that the row is found in the page cache, retrieving the row from the page cache, unpacking it, and storing the unpacked row in the row cache.

* * * * *